United States Patent
Yamashita et al.

(10) Patent No.: US 7,081,431 B2
(45) Date of Patent: Jul. 25, 2006

(54) $NO_X$ ABSORBENT AND ABSORPTION REDUCTION-TYPE $NO_X$ PURIFYING CATALYST

(75) Inventors: Tetsuya Yamashita, Gotenba (JP); Shinichi Takeshima, Susono (JP); Toshiaki Tanaka, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 36 days.

(21) Appl. No.: 10/363,388

(22) PCT Filed: Sep. 3, 2001

(86) PCT No.: PCT/JP01/07614

§ 371 (c)(1),
(2), (4) Date: Mar. 3, 2003

(87) PCT Pub. No.: WO02/20153

PCT Pub. Date: Mar. 14, 2002

(65) Prior Publication Data

US 2003/0181330 A1    Sep. 25, 2003

(30) Foreign Application Priority Data

Sep. 8, 2000    (JP) .......................... 2000-278687

(51) Int. Cl.
*B01J 23/56* (2006.01)
*B01J 23/00* (2006.01)
*B01J 23/58* (2006.01)
*B01J 23/44* (2006.01)
*B01J 23/42* (2006.01)

(52) U.S. Cl. .......... 502/332; 502/349; 502/327; 502/328; 502/333; 502/334; 502/339; 502/415; 502/439

(58) Field of Classification Search ............ 502/302, 502/303, 304, 349, 355, 325–328, 330, 332–334, 502/339, 415, 439
See application file for complete search history.

(56) References Cited

U.S. PATENT DOCUMENTS

| | | | |
|---|---|---|---|
| 5,075,276 A | 12/1991 | Ozawa et al. | |
| 5,202,300 A | 4/1993 | Funabiki et al. | |
| 6,060,420 A * | 5/2000 | Munakata et al. | 502/302 |
| 6,214,306 B1 * | 4/2001 | Aubert et al. | 423/213.2 |
| 6,261,989 B1 * | 7/2001 | Tanaka et al. | 502/217 |
| 6,306,794 B1 * | 10/2001 | Suzuki et al. | 502/304 |
| 6,358,880 B1 * | 3/2002 | Hedouin et al. | 502/302 |

(Continued)

FOREIGN PATENT DOCUMENTS

EP    0 982 066 A1    3/2000

(Continued)

*Primary Examiner*—Cam N Nguyen
(74) *Attorney, Agent, or Firm*—Oliff & Berridge PLC

(57) ABSTRACT

An exhaust gas purifying catalyst capable of exerting excellent $NO_x$ purifying capability even at high exhaust gas temperatures, exceeding 500° C., is provided.

The catalyst is an absorption reduction-type $NO_x$ purifying catalyst comprising an $NO_x$ absorbent obtained by loading at least one alkali metal or alkaline earth metal on a crystalline $ZrO_2$ composite oxide having added thereto at least one trivalent rare earth metal or divalent alkaline earth metal. Preferably, aluminum is further supported on the $ZrO_2$ composite oxide. The $NO_x$ absorbent is considered to have an $NO_x$ absorption mechanism that an electron released from the alkali metal or the like enters into an oxygen vacancy part of the crystalline $ZrO_2$ and this oxygen vacancy part functions as a strong base site for donating an electron to an electrophilic component such as $NO_x$.

6 Claims, 8 Drawing Sheets

U.S. PATENT DOCUMENTS

| | | | |
|---|---|---|---|
| 6,365,123 B1 * | 4/2002 | Narula et al. | 423/608 |
| 6,387,338 B1 * | 5/2002 | Anatoly et al. | 423/239.1 |
| 6,511,642 B1 * | 1/2003 | Hatanaka et al. | 423/239.1 |
| 6,692,712 B1 * | 2/2004 | Andersen | 423/239.1 |

FOREIGN PATENT DOCUMENTS

| | | |
|---|---|---|
| EP | 1 013 334 A1 | 6/2000 |
| EP | 1 036 591 A1 | 9/2000 |
| EP | 1 053 779 A1 | 11/2000 |
| JP | A 62-168544 | 7/1987 |
| JP | A 5-115780 | 5/1993 |
| JP | A 6-327945 | 11/1994 |
| JP | A 7- 51544 | 2/1995 |
| JP | 9-24247 | 1/1997 |
| JP | A 9-24274 | 1/1997 |
| JP | 10-216509 | 8/1998 |
| JP | 10-218620 | 8/1998 |
| JP | 10-290931 | 11/1998 |
| JP | A 10-338525 | 12/1998 |
| JP | A 11-13462 | 1/1999 |
| JP | A 11-169712 | 6/1999 |
| JP | A 11-226404 | 8/1999 |
| JP | 11-347370 | 12/1999 |
| JP | A 2000-327329 | 11/2000 |
| JP | A 2001-38211 | 2/2001 |
| JP | A 2001-46835 | 2/2001 |
| JP | A 2001-70791 | 3/2001 |
| JP | A 2001-212464 | 8/2001 |
| WO | WO 00/00283 | 1/2000 |

* cited by examiner

$NO_x$ ABSORBENT AND ABSORPTION REDUCTION-TYPE $NO_x$ PURIFYING CATALYST

TECHNICAL FIELD

The present invention relates to a novel $NO_x$ absorbent which is used in a catalyst for purifying an exhaust gas discharged from an automobile engine and the like and can remarkably improve the $NO_x$ purifying capability at high temperatures, and also relates to an absorption reduction-type $NO_x$ purifying catalyst.

BACKGROUND ART

Recently, from the standpoint of global conservation, it is a worldwide problem to suppress the total amount of carbon dioxide ($CO_2$) exhausted from an internal combustion engine such as automobile engine and the generated amount of nitrogen oxide ($NO_x$). In order to solve this problem, a lean-burn engine has been developed for the purpose of improving the fuel consumption and an absorption reduction-type $NO_x$ purifying catalyst, obtained by adding a function of occluding $NO_x$ in a lean atmosphere to a conventional three-way catalyst, has been developed for the purpose of purifying the exhaust gas of the lean-burn engine. These technologies are having some success against the above-described problem.

In the lean-burn engine combined with the absorption reduction-type $NO_x$ purifying catalyst, the fuel is usually burned in a lean (oxygen-excess) condition and temporarily burned in a stoichiometric (at a theoretical air-fuel ratio) or rich (fuel-excess) condition.

HC (hydrocarbon) or CO in the exhaust gas is efficiently burned and removed in the lean condition by the action of catalyst using the oxidative atmosphere. On the other hand, $NO_x$ is captured by an absorbent in the lean condition and this is temporarily released in the stoichiometric or rich condition and reduced and purified by the action of catalyst using the reducing atmosphere.

By virtue of these combustion conditions and actions of the absorption reduction-type $NO_x$ purifying catalyst, as a whole, the fuel consumption is improved and, at the same time, HC, CO and $NO_x$ in the exhaust gas can be purified with good efficiency.

In this absorption reduction-type $NO_x$ purifying catalyst, a noble metal such as Pt, Au, Pd and Rh is used as the catalyst component and an alkali metal such as K and Na or an alkaline earth metal such as Ca and Ba is used as the $NO_x$ absorbent.

This lean-burn system established by combining the control of an air-fuel ratio and the $NO_x$ absorbent is successful to a certain extent in solving the problem to improve the fuel consumption and reduce the total generation amount of CO, HC and $NO_x$ as compared with the conventional system using a three-way catalyst and combustion in the vicinity of theoretical air-fuel ratio.

Japanese Unexamined Patent Publication (Kokai) No. 9-24274 describes an exhaust gas purifying catalyst comprising a composite oxide containing alumina and zirconia and having an acid point and a base point, and Kokai No. 11-226404 describes a stabilized zirconia support for improving the steam reforming reactivity of catalyst component Rh.

However, the absorption reduction-type $NO_x$ purifying catalyst using the above-described alkali metal or alkaline earth metal as the $NO_x$ absorbent has a problem that the $NO_x$ purifying capability decreases when the exhaust gas temperature is high and exceeds about 500° C.

This is thought to occur because, although the alkali metal or alkaline earth metal exerts the function as $NO_x$ absorbent by absorbing $NO_x$ while forming a nitrate in the lean side and by releasing $NO_x$ while forming a carbonate in the rich side, the nitrate or the like of the alkali metal or alkaline earth metal decomposes at a high temperature exceeding about 500° C. and, therefore, the intended function cannot be brought out.

Accordingly, an object of the present invention is to provide an exhaust gas purifying catalyst capable of exerting high $NO_x$ purifying capability even at a high temperature exceeding about 500° C. by using, as the $NO_x$ absorbent, a specific modified $ZrO_2$ composite oxide, different from those in conventional techniques, in place of an alkali metal or an alkaline earth metal.

DISCLOSURE OF THE INVENTION

The object of the present invention can be attained by an $NO_x$ absorbent comprising a crystalline $ZrO_2$ composite oxide having supported thereon at least one alkali metal or alkaline earth metal, the composite oxide being added with at least one element selected from trivalent rare earth metals and divalent alkaline earth metals, and also by an absorption reduction-type $NO_x$ purifying catalyst comprising this $NO_x$ absorbent.

More specifically, the present invention is characterized by using a specific modified crystalline $ZrO_2$ composite oxide as the $NO_x$ absorbent. The crystalline $ZrO_2$ composite oxide is considered to have the following $NO_x$ absorption mechanism.

Zr constituting the crystalline $ZrO_2$ composite oxide is tetravalent and therefore, when a trivalent rare earth metal or a divalent alkaline earth metal is added, an oxygen vacancy is generated in the crystalline $ZrO_2$ composite oxide. When an alkali metal or an alkaline earth metal is subsequently supported thereon, an electron released from the alkali metal or alkaline earth metal enters into the oxygen vacancy part. This electron is bound by a constituent element in the structure of crystalline $ZrO_2$ composite oxide but the binding degree is low because the electron is present in the oxygen vacancy part, therefore, the electron can be readily bonded to an electrophilic component such as $NO_x$, particularly $NO_2$. In other words, the crystalline $ZrO_2$ composite oxide can be rich in "strong base sites" which readily donate electrons to electrophilic components.

As the $ZrO_2$ composite oxide is crystalline, the supported alkali metal or alkaline earth metal stays in the vicinity of surface of the crystalline $ZrO_2$ composite oxide and, therefore, the strong base site is present in the vicinity of surface of the crystalline $ZrO_2$ composite oxide and can effectively act on $NO_x$, particularly $NO_2$, in the exhaust gas. Incidentally, it has been verified by the present inventors that, if the $ZrO_2$ composite oxide is non-crystalline, the alkali metal or alkaline earth metal supported enters inside the $ZrO_2$ composite oxide and the strong base site is not produced.

The crystalline $ZrO_2$ composite oxide having a strong base site in the vicinity of surface, as such, donates an electron less bound by a constituent element to $NO_2$ in the exhaust gas and thereby $NO_2$ can have a negative electric charge. At the same time, the crystalline $ZrO_2$ composite oxide becomes to have a positive electric charge as a result of the electron donation. By the attractive force between these electric charges, the crystalline $ZrO_2$ composite oxide is presumed to absorb $NO_2$ as the negative ion.

It is considered that the crystalline $ZrO_2$ composite oxide has a large $NO_2$ ion absorbing energy due to the attractive force between electric charges and thereby can exert the function of an $NO_x$ absorbent using the above-described absorption mechanism even at a temperature in excess of 500° C.

BEST MODE FOR CARRYING OUT THE INVENTION

Figure 1:
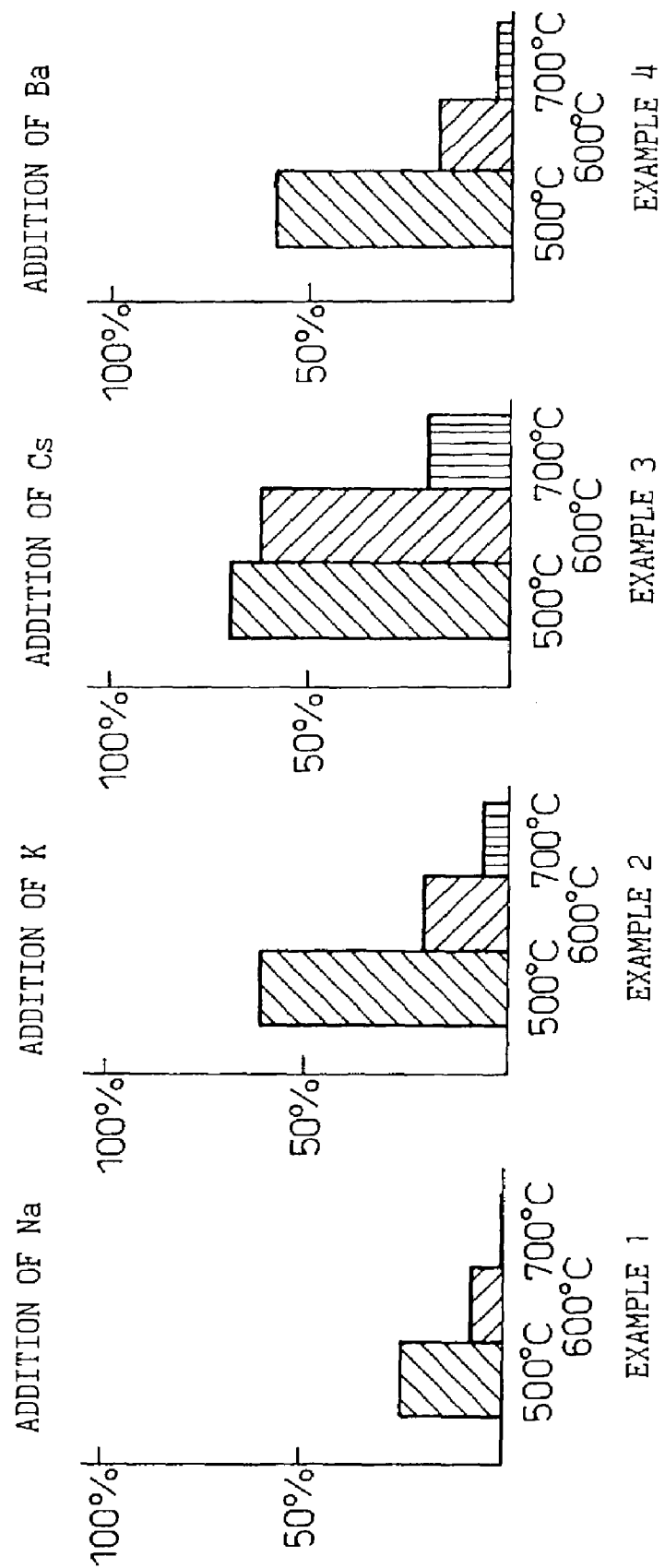
FIG. 1 is a graph comparing the $NO_x$ purification percentage of the exhaust gas purifying catalyst of the present invention at high temperatures by varying the component added.
Figure 2:
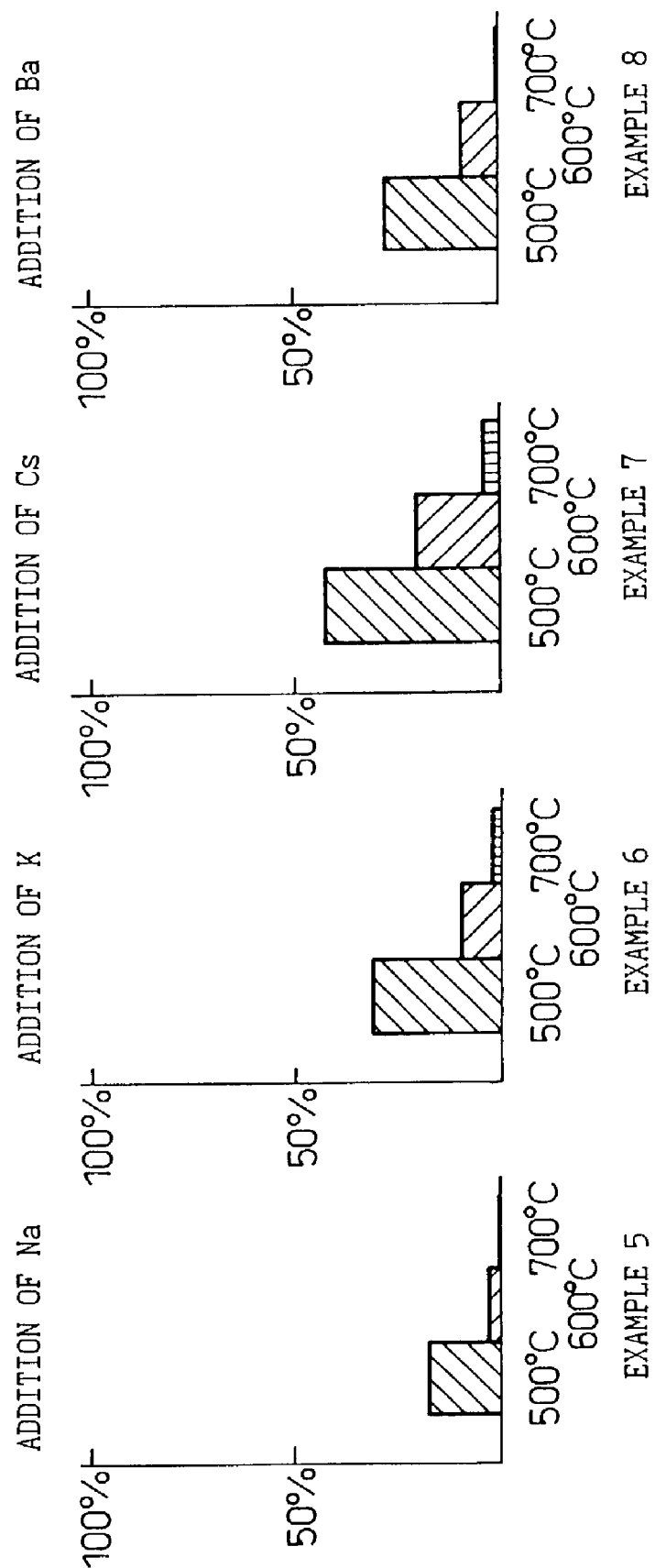
FIG. 2 is a graph comparing the $NO_x$ purification percentage of the exhaust gas purifying catalyst of the present invention at high temperatures by varying the component added.
Figure 3:
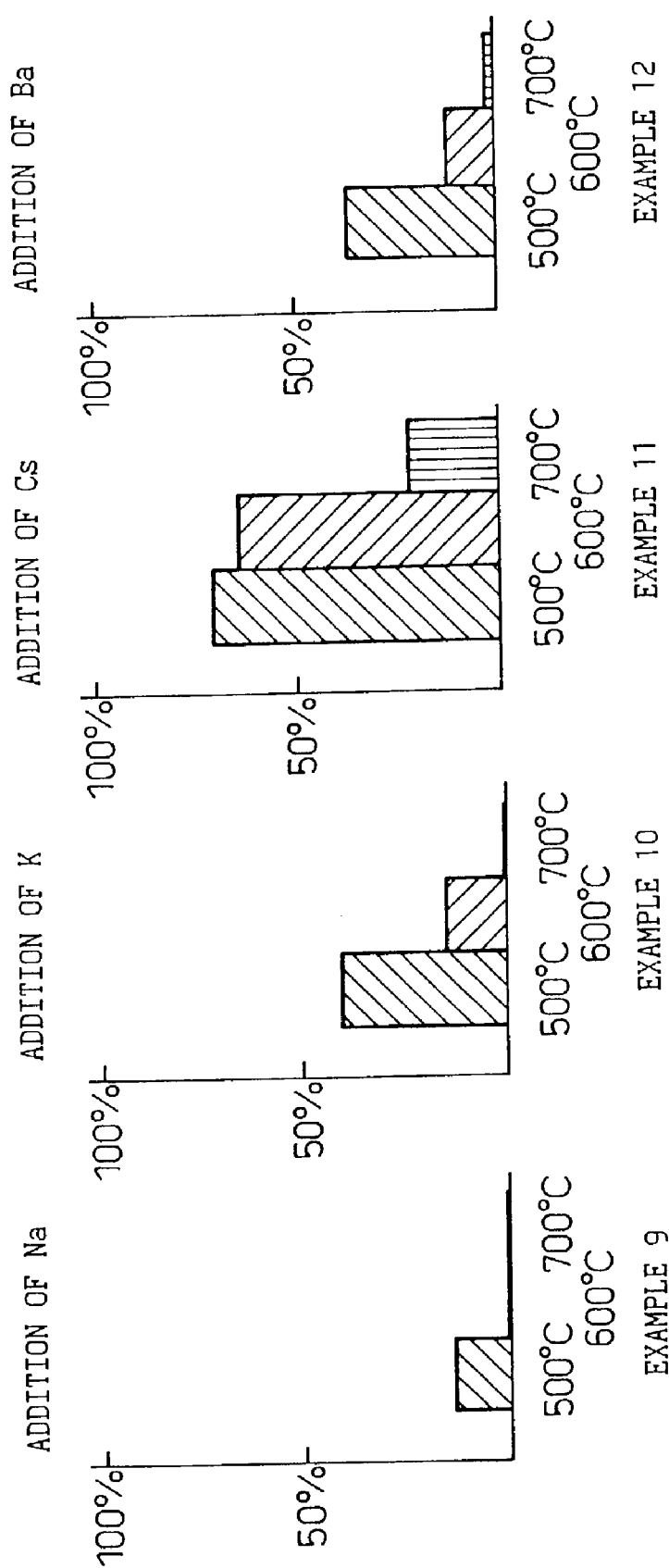
FIG. 3 is a graph comparing the $NO_x$ purification percentage of the exhaust gas purifying catalyst of the present invention at high temperatures by varying the component added.
Figure 4:
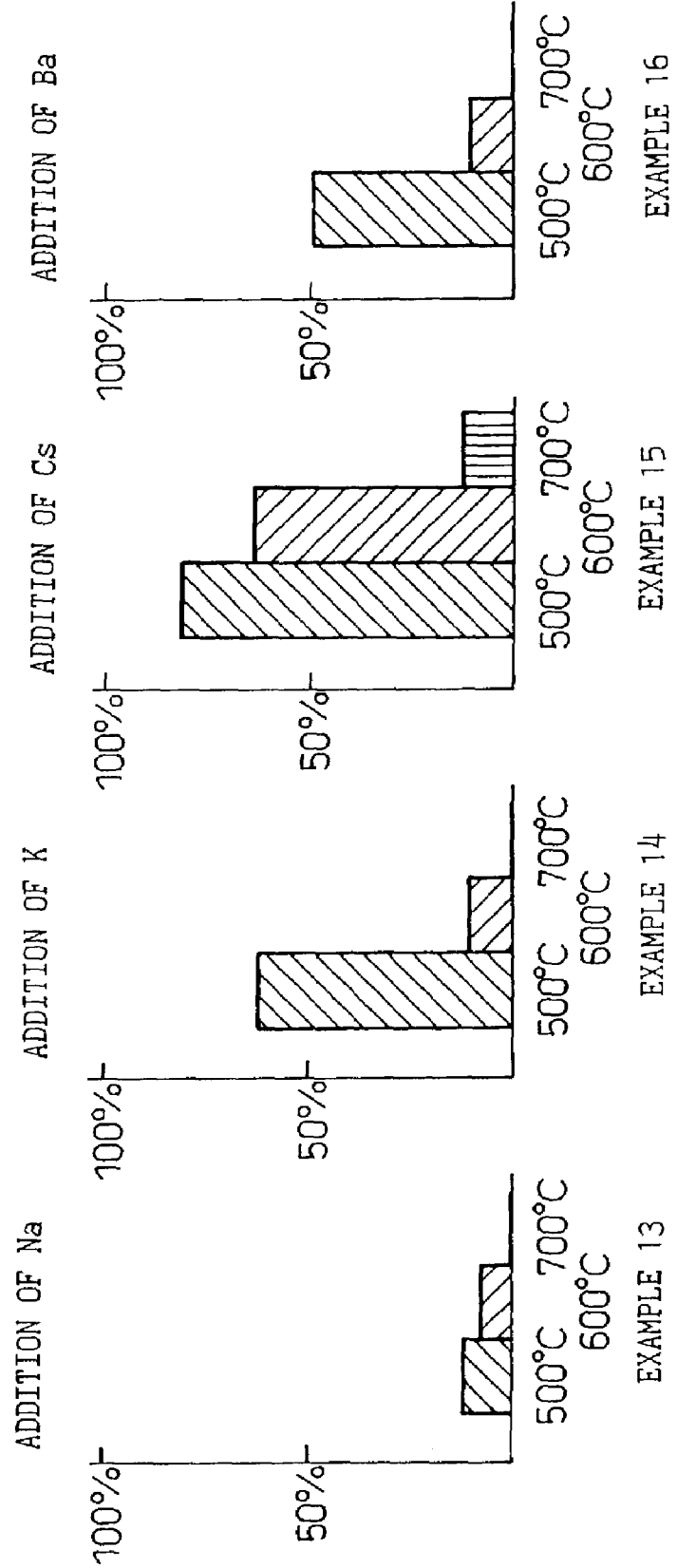
FIG. 4 is a graph comparing the $NO_x$ purification percentage of the exhaust gas purifying catalyst of the present invention at high temperatures by varying the component added.
Figure 5:
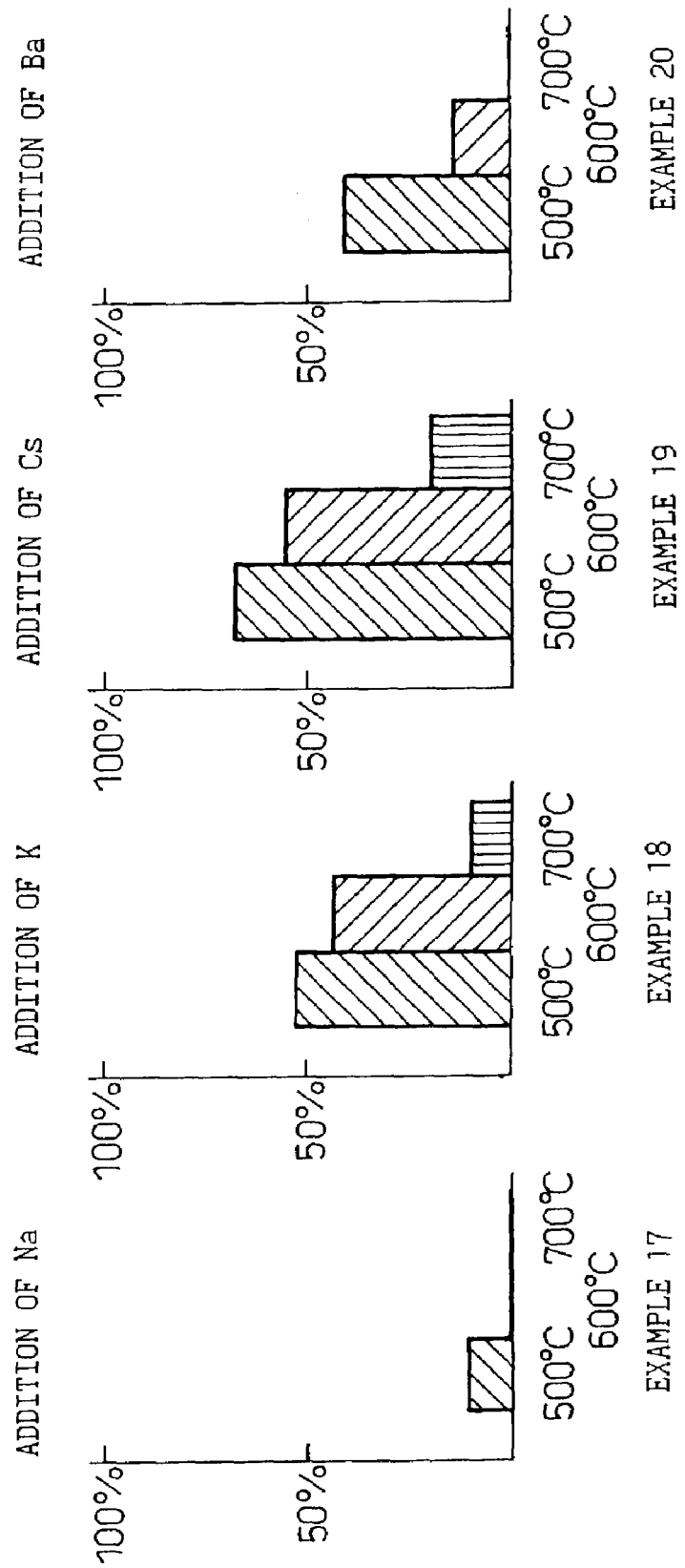
FIG. 5 is a graph comparing the $NO_x$ purification percentage of the exhaust gas purifying catalyst of the present invention at high temperatures by varying the component added.
Figure 6:
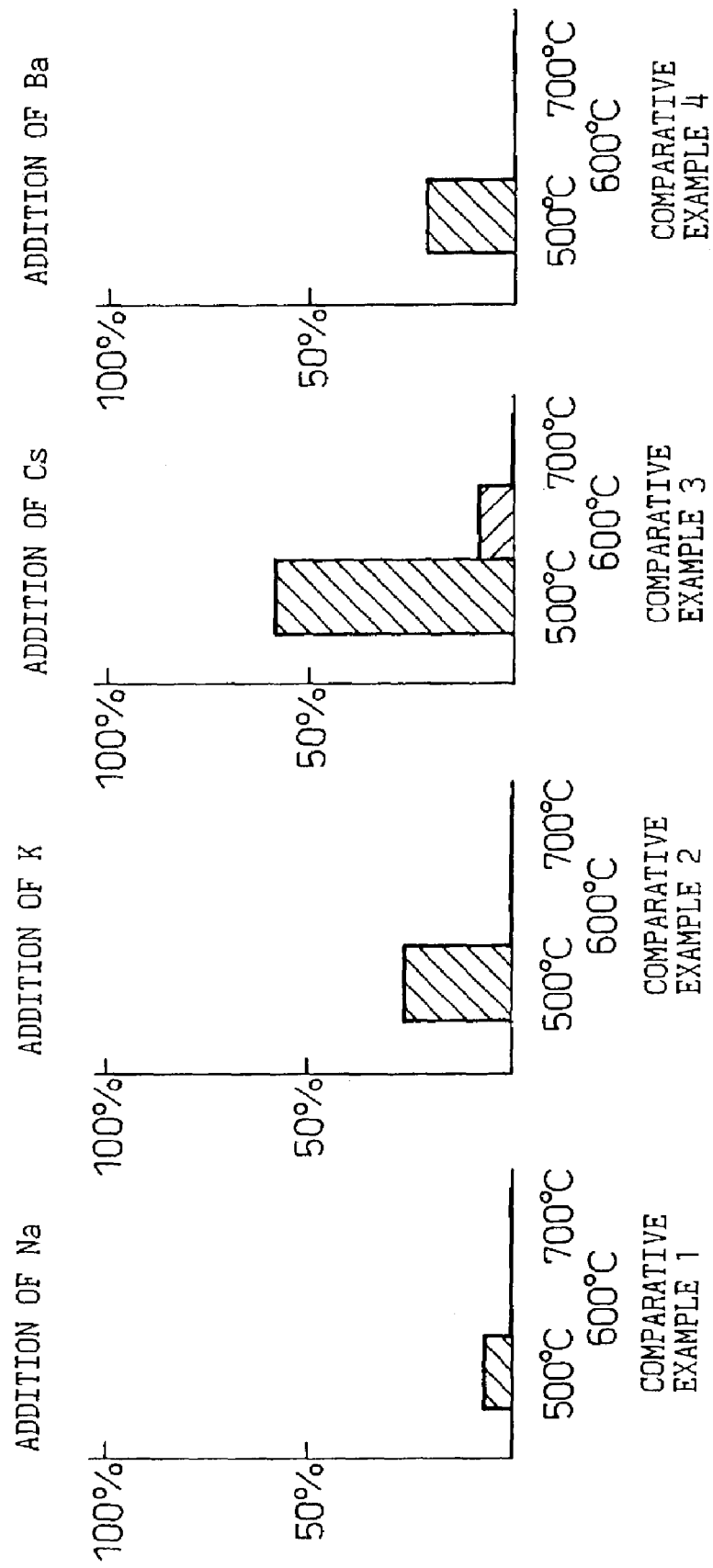
FIG. 6 is a graph comparing the $NO_x$ purification percentage of the exhaust gas purifying catalyst of the present invention at high temperatures by varying the component added.

The $NO_x$ absorbent of the present invention comprises a crystalline $ZrO_2$ composite oxide having supported thereon at least one alkali metal or alkaline earth metal, the composite oxide being added with at least one trivalent rare earth metal or divalent alkaline earth metal.

Examples of the trivalent rare earth metal include Sc, Y, La, Nd, Pm, Sm, Eu, Gd, Dy, Ho, Er, Tm, Yb and Lu. Examples of the divalent alkaline earth metal include Mg, Ca, Sr, Ba and Ra. In the $NO_x$ absorbent of the present invention, a crystalline $ZrO_2$ composite oxide having an oxygen vacancy formed by adding at least one element of these trivalent rare earth metals and divalent alkaline earth metals to $ZrO_2$ is used.

For example, an aqueous solution of a nitrate, an acetate, a carbonate or the like of the above-described trivalent rare earth metal or divalent alkaline earth metal is impregnated into $ZrO_2$ powder and this powder is dried and calcined in an air atmosphere at 700 to 1,200° C. to solid-dissolve the trivalent rare earth metal or the like in $ZrO_2$, whereby the crystalline $ZrO_2$ composite oxide having an oxygen vacancy can be obtained.

In the obtained crystalline $ZrO_2$ composite oxide having an oxygen vacancy, when represented by the chemical structural formula:

$$M_m Zr_{1-m} O_n$$

preferably $0.01 < m < 0.5$, more preferably $0.1 < m < 0.2$, and $1.5 < n < 2.0$, more preferably $1.8 < n < 1.95$.

On this crystalline $ZrO_2$ composite oxide having an oxygen vacancy, at least one alkali metal or alkaline earth metal is supported. Examples of the alkali metal include Li, Na, K, Rb, Cs and Fr, and examples of the alkaline earth metal include Mg, Ca, Sr, Ba and Ra.

For example, the $ZrO_2$ composite oxide is impregnated with an aqueous solution of a nitrate, an acetate, a carbonate or the like of this alkali metal or alkaline earth metal, then dried and calcined in an air atmosphere at 400 to 800° C., whereby the alkali metal or alkaline earth metal can be supported on the crystalline $ZrO_2$ composite oxide having an oxygen vacancy.

By this loading, an electron released from the alkali metal or alkaline earth metal is presumed to enter into the oxygen vacancy part of the crystalline $ZrO_2$ composite oxide having an oxygen vacancy, thereby producing a strong base site.

The amount of the alkali metal or alkaline earth metal supported is preferably from 0.01 to 0.3 mol, more preferably from 0.03 to 0.1 mol, per mol of Zr.

It is found that the capability of the $NO_x$ absorbent can be more enhanced by further loading Al on the crystalline $ZrO_2$. The reason therefor is considered to be because the previously loaded alkali metal or alkaline earth metal is stabilized and high dispersibility of alkali metal or the like is attained.

For loading Al, for example, the crystalline $ZrO_2$ composite oxide is impregnated with a solution of aluminum nitrate, $Al(OCH(CH_3)_2)_3$ or the like, then dried and calcined in an air atmosphere at 400 to 800° C.

The amount of Al supported is preferably 1 mol or less, more preferably from 0.5 to 0.001 mol, still more preferably from 0.2 to 0.001 mol, per mol of Zr.

The absorption reduction-type $NO_x$ purifying catalyst of the present invention comprises a catalyst component of accelerating the oxidation/reduction of $NO_x$. This catalyst component is preferably a noble metal such as Pt, Au, Ru, Rh, Pd and Ir.

The catalyst component may be supported on an oxide support such as alumina, zirconia, titania and silica-alumina and be present together with the $NO_x$ absorbent, or may be directly supported on the $NO_x$ absorbent.

The method for loading the catalyst component can be selected from a wide range of methods, for example, evaporation to dryness, precipitation, adsorption, ion exchange and reduction-deposition.

EXAMPLES

Example 1

Scandium nitrate was added to $ZrO_2$ powder and this powder was calcined in an air at about 1,000° C. and then pulverized to obtain a solid solution powder with an oxygen vacancy having a composition of $Sc_{0.11}Zr_{0.89}O_{1.945}$.

Thereafter, 120 g of this powder having a composition of $Sc_{0.11}Zr_{0.89}O_{1.945}$ was impregnated with an aqueous sodium nitrate solution, then dried in an air at 120° C. for one hour and calcined in an air at 500° C.

The resulting powder was calcined in an air at 850° C. for 2 hours to stabilize Na and, at the same time, dissipate unstable Na not taken in into the solid solution, thereby obtaining an $NO_x$ absorbent having a strong base point. The obtained $NO_x$ absorbent had a composition of $Sc_{0.11}Zr_{0.89}O_{1.945}/Na_{0.2}$.

Separately, 120 g of γ-$Al_2O_3$ powder was impregnated with an aqueous dinitrodiammine platinum solution in an amount corresponding to 2 g of Pt and rhodium nitrate in an amount corresponding to 0.1 g of Rh, then dried in air at 120° C. for one hour and calcined in air at 500° C. for one hour to obtain $\gamma$-$Al_2O_3$ having supported thereon Pt and Rh as catalyst components (hereinafter referred to as "Pt supported $\gamma$-$Al_2O_3$").

The $NO_x$ absorbent was mixed with the Pt supported $\gamma$-$Al_2O_3$ in an equivalent mass and the mixture was pelletized to obtain a catalyst of the present invention.

Example 2

An $NO_x$ absorbent having a composition of $Sc_{0.11}Zr_{0.89}O_{1.945}/K_{0.2}$ was prepared in the same manner as in Example 1 except for using an aqueous potassium nitrate solution in place of the aqueous sodium nitrate solution of Example 1.

The obtained $NO_x$ absorbent was mixed with the Pt supported $\gamma$-$Al_2O_3$ in an equivalent mass similarly to Example 1 and the mixture was pelletized to obtain a catalyst of the present invention.

Example 3

An $NO_x$ absorbent having a composition of $Sc_{0.11}Zr_{0.89}O_{1.945}/Cs_{0.2}$ was prepared in the same manner as in Example 1 except for using an aqueous cesium nitrate solution in place of the aqueous sodium nitrate solution of Example 1.

The obtained $NO_x$ absorbent was mixed with the Pt supported $\gamma$-$Al_2O_3$ in an equivalent mass similarly to Example 1 and the mixture was pelletized to obtain a catalyst of the present invention.

Example 4

An $NO_x$ absorbent having a composition of $Sc_{0.11}Zr_{0.89}O_{1.945}/Ba_{0.2}$ was prepared in the same manner as in Example 1 except for using an aqueous barium acetate solution in place of the aqueous sodium nitrate solution of Example 1.

The obtained $NO_x$ absorbent was mixed with the Pt supported $\gamma$-$Al_2O_3$ in an equivalent mass similarly to Example 1 and the mixture was pelletized to obtain a catalyst of the present invention.

Example 5

An $NO_x$ absorbent having a composition of $Y_{0.07}Zr_{0.93}O_{1.965}/Na_{0.2}$ was prepared in the same manner as in Example 1 except for using yttrium nitrate in place of the scandium nitrate of Example 1. The obtained $NO_x$ absorbent was mixed with the Pt supported $\gamma$-$Al_2O_3$ in an equivalent mass similarly to Example 1 and the mixture was pelletized to obtain a catalyst of the present invention.

Example 6

An $NO_x$ absorbent having a composition of $Y_{0.07}Zr_{0.93}O_{1.965}/K_{0.2}$ was prepared in the same manner as in Example 2 except for using yttrium nitrate in place of the scandium nitrate of Example 2. The obtained $NO_x$ absorbent was mixed with the Pt supported $\gamma$-$Al_2O_3$ prepared in an equivalent mass similarly to Example 2 and the mixture was pelletized to obtain a catalyst of the present invention.

Example 7

An $NO_x$ absorbent having a composition of $Y_{0.07}Zr_{0.93}O_{1.965}/Cs_{0.2}$ was prepared in the same manner as in Example 3 except for using yttrium nitrate in place of the scandium nitrate of Example 3. The obtained $NO_x$ absorbent was mixed with the Pt supported $\gamma$-$Al_2O_3$ in an equivalent mass similarly to Example 3 and the mixture was pelletized to obtain a catalyst of the present invention.

Example 8

An $NO_x$ absorbent having a composition of $Y_{0.07}Zr_{0.93}O_{1.965}/Ba_{0.2}$ was prepared in the same manner as in Example 4 except for using yttrium nitrate in place of the scandium nitrate of Example 4. The obtained $NO_x$ absorbent was mixed with the Pt supported $\gamma$-$Al_2O_3$ in an equivalent mass similarly to Example 4 and the mixture was pelletized to obtain a catalyst of the present invention.

Example 9

An $NO_x$ absorbent having a composition of $La_{0.2}Zr_{0.8}O_{1.9}/Na_{0.2}$ was prepared in the same manner as in Example 1 except for using lanthanum nitrate in place of the scandium nitrate of Example 1. The obtained $NO_x$ absorbent was mixed with the Pt supported $\gamma$-$Al_2O_3$ in an equivalent mass similarly to Example 1 and the mixture was pelletized to obtain a catalyst of the present invention.

Example 10

An $NO_x$ absorbent having a composition of $La_{0.2}Zr_{0.8}O_{1.9}/K_{0.2}$ was prepared in the same manner as in Example 2 except for using lanthanum nitrate in place of the scandium nitrate of Example 2. The obtained $NO_x$ absorbent was mixed with the Pt supported $\gamma$-$Al_2O_3$ in an equivalent mass similarly to Example 2 and the mixture was pelletized to obtain a catalyst of the present invention.

Example 11

An $NO_x$ absorbent having a composition of $La_{0.2}Zr_{0.8}O_{1.9}/Cs_{0.2}$ was prepared in the same manner as in Example 3 except for using lanthanum nitrate in place of the scandium nitrate of Example 3. The obtained $NO_x$ absorbent was mixed with the Pt supported $\gamma$-$Al_2O_3$ in an equivalent mass similarly to Example 3 and the mixture was pelletized to obtain a catalyst of the present invention.

Example 12

An $NO_x$ absorbent having a composition of $La_{0.2}Zr_{0.8}O_{1.9}/Ba_{0.2}$ was prepared in the same manner as in Example 4 except for using lanthanum nitrate in place of the scandium nitrate of Example 4. The obtained $NO_x$ absorbent was mixed with the Pt supported $\gamma$-$Al_2O_3$ in an equivalent mass similarly to Example 4 and the mixture was pelletized to obtain a catalyst of the present invention.

Example 13

An $NO_x$ absorbent having a composition of $Mg_{0.12}Zr_{0.88}O_{1.94}/Na_{0.2}$ was prepared in the same manner as in Example 1 except for using magnesium nitrate in place of the scandium nitrate of Example 1. The obtained $NO_x$ absorbent was mixed with the Pt supported $\gamma$-$Al_2O_3$ in an equivalent mass similarly to Example 1 and the mixture was pelletized to obtain a catalyst of the present invention.

Example 14

An $NO_x$ absorbent having a composition of $Mg_{0.12}Zr_{0.88}O_{1.94}/K_{0.2}$ was prepared in the same manner as in Example 2 except for using magnesium nitrate in place of the scandium nitrate of Example 2. The obtained $NO_x$ absorbent was mixed with the Pt supported $\gamma$-$Al_2O_3$ in an equivalent mass similarly to Example 2 and the mixture was pelletized to obtain a catalyst of the present invention.

Example 15

An $NO_x$ absorbent having a composition of $Mg_{0.12}Zr_{0.88}O_{1.94}/Cs_{0.2}$ was prepared in the same manner as in Example 3 except for using magnesium nitrate in place of the scandium nitrate of Example 3. The obtained $NO_x$ absorbent was mixed with the Pt supported $\gamma$-$Al_2O_3$ in an equivalent mass similarly to Example 3 and the mixture was pelletized to obtain a catalyst of the present invention.

Example 16

An $NO_x$ absorbent having a composition of $Mg_{0.12}Zr_{0.88}O_{1.94}/Ba_{0.2}$ was prepared in the same manner as in Example 4 except for using magnesium nitrate in place of the scandium nitrate of Example 4. The obtained $NO_x$ absorbent was mixed with the Pt supported $\gamma$-$Al_2O_3$ in an equivalent mass similarly to Example 4 and the mixture was pelletized to obtain a catalyst of the present invention.

Example 17

An $NO_x$ absorbent having a composition of $Ca_{0.14}Zr_{0.86}O_{1.93}/Na_{0.2}$ was prepared in the same manner as in Example 1 except for using calcium nitrate in place of the scandium nitrate of Example 1. The obtained $NO_x$ absorbent was mixed with the Pt supported $\gamma$-$Al_2O_3$ in an equivalent mass similarly to Example 1 and the mixture was pelletized to obtain a catalyst of the present invention.

Example 18

An $NO_x$ absorbent having a composition of $Ca_{0.14}Zr_{0.86}O_{1.93}/K_{0.2}$ was prepared in the same manner as in Example 2 except for using calcium nitrate in place of the scandium nitrate of Example 2. The obtained $NO_x$ absorbent was mixed with the Pt supported $\gamma$-$Al_2O_3$ in an equivalent mass similarly to Example 2 and the mixture was pelletized to obtain a catalyst of the present invention.

Example 19

An $NO_x$ absorbent having a composition of $Ca_{0.14}Zr_{0.86}O_{1.93}/Cs_{0.2}$ was prepared in the same manner as in Example 3 except for using calcium nitrate in place of the scandium nitrate of Example 3. The obtained $NO_x$ absorbent was mixed with the Pt supported $\gamma$-$Al_2O_3$ in an equivalent mass similarly to Example 3 and the mixture was pelletized to obtain a catalyst of the present invention.

Example 20

An $NO_x$ absorbent having a composition of $Ca_{0.14}Zr_{0.86}O_{1.93}/Ba_{0.2}$ was prepared in the same manner as in Example 4 except for using calcium nitrate in place of the scandium nitrate of Example 4. The obtained $NO_x$ absorbent was mixed with the Pt supported $\gamma$-$Al_2O_3$ in an equivalent mass similarly to Example 4 and the mixture was pelletized to obtain a catalyst of the present invention.

Example 21

This Example shows a case where aluminum is further supported on the composite oxide.

The solid solution powder with an oxygen vacancy having a composition of $La_{0.2}Zr_{0.8}O_{1.9}$ used in Example 9 was impregnated with an aqueous aluminum nitrate solution, then dried in an air at 120° C. for one hour and calcined in an air at 650° C. for one hour to obtain a composite oxide having supported thereon 0.005 mol of $Al_2O_3$ per mol of the composite oxide $La_{0.2}Zr_{0.8}O_{1.9}$.

On this composite oxide, Cs was supported in the same manner as in Example 3 to prepare an $NO_x$ absorbent having a composition of $La_{0.2}Zr_{0.8}O_{1.9}/(Al_2O_3)_{0.05}/Cs_{0.2}$. The obtained $NO_x$ absorbent was mixed with the Pt supported $\gamma$-$Al_2O_3$ in an equivalent mass similarly to Example 1 and the mixture was pelletized to obtain a catalyst of the present invention.

Example 22

This Example shows a case where aluminum is further supported on the composite oxide and Pt and Cs are supported thereon.

The solid solution powder with an oxygen vacancy having a composition of $La_{0.2}Zr_{0.8}O_{1.9}$ used in Example 9 was impregnated with an aqueous aluminum nitrate solution, then dried in an air at 120° C. for one hour and calcined in an air at 650° C. for one hour to obtain a composite oxide having supported thereon 0.005 mol of $Al_2O_3$ per mol of the composite oxide $La_{0.2}Zr_{0.8}O_{1.9}$.

Subsequently, 120 g of the obtained composite oxide was impregnated with an aqueous dinitrodiammine platinum solution in an amount corresponding to 2 g of Pt, then dried in an air at 120° C. for one hour and calcined in an air at 500° C. for one hour, thereby loading Pt as the catalyst component.

Thereafter, 0.2 mol of Cs was loaded per 120 g of the composite oxide in the same manner as in Example 3 per 120 g of the composite oxide. Then, $\gamma$-$Al_2O_3$ in an equivalent mass was mixed and the mixture was pelletized to obtain a catalyst of the present invention.

Comparative Example 1

120 g of $\gamma$-$Al_2O_3$ powder was impregnated with an aqueous dinitrodiammine platinum solution in an amount corresponding to 2 g of Pt and rhodium nitrate in an amount corresponding to 0.1 g of Rh, then dried in an air at 120° C. for one hour and calcined in an air at 500° C. for one hour, thereby loading Pt and Rh as the catalyst components.

Subsequently, the resulting powder was impregnated with an aqueous Na nitrate solution, then dried in an air at 120° C. for one hour and calcined in an air at 500° C. for one hour to load 0.2 mol of Na per 120 g of $\gamma$-$Al_2O_3$ powder. Thereafter, $\gamma$-$Al_2O_3$ in an equivalent mass was mixed and the mixture was pelletized to obtain a comparative catalyst.

Comparative Example 2

A comparative catalyst where Pt, Rh and K were supported on $\gamma$-$Al_2O_3$ powder was obtained in the same manner as in Comparative Example 1 except for using an aqueous potassium nitrate solution in place of the aqueous sodium nitrate solution.

Comparative Example 3

A comparative catalyst where Pt, Rh and Cs were supported on $\gamma$-$Al_2O_3$ powder was obtained in the same manner as in Comparative Example 1 except for using an aqueous cesium nitrate solution in place of the aqueous sodium nitrate solution.

Comparative Example 4

A comparative catalyst where Pt, Rh and Ba were supported on γ-$Al_2O_3$ powder was obtained in the same manner as in Comparative Example 1 except for using an aqueous barium nitrate solution in place of the aqueous sodium nitrate solution.

-Evaluation of $NO_x$ Purification Percentage- (1) $NO_x$ Purification Percentage at 500 to 700° C.

The catalysts of Examples 1 to 20 and Comparative Examples 1 to 4 each was evaluated on the $NO_x$ purification percentage at 500° C., 600° C. and 700° C. under the following conditions.

| Gas composition | 1,000 ppm of CO + 667 ppm of $C_3H_6$ + 250 ppm of NO + 7.3% of $O_2$ + 6.7% of $CO_2$ + 5% of $H_2O$ (balance: $N_2$) |
|---|---|
| Gas space velocity: | 50,000 $h^{-1}$ |

FIGS. 1 to 6 show the $NO_x$ purification percentage ($NO_x$ purification percentage for one minute) determined according to the following formula:

Purification percentage=[(incoming gas concentration−outgoing gas concentration)÷incoming gas concentration]×100

It is seen from the results shown in FIGS. 1 to 6 that the $NO_x$ absorbent obtained by adding Na, K, Cs or Ba to a crystalline $ZrO_2$ composite oxide enhances the $NO_x$ purifying capability at high temperatures with a tendency that the effect of Cs is higher than K, Ba and Na, and K and Ba are almost on the same level and higher than Na (Cs>K≈Ba>Na).

Also, it is seen from comparison with the $NO_x$ absorbent of Comparative Examples obtained by adding Na, K, Cs or Ba to γ-alumina that the $NO_x$ purification percentage is higher in Examples with any component added and the $NO_x$ purifying capability at high temperatures is enhanced by the $NO_x$ absorbent of the present invention.

(2) $NO_x$ Purification Percentage at 300 to 700° C.

Figure 7:
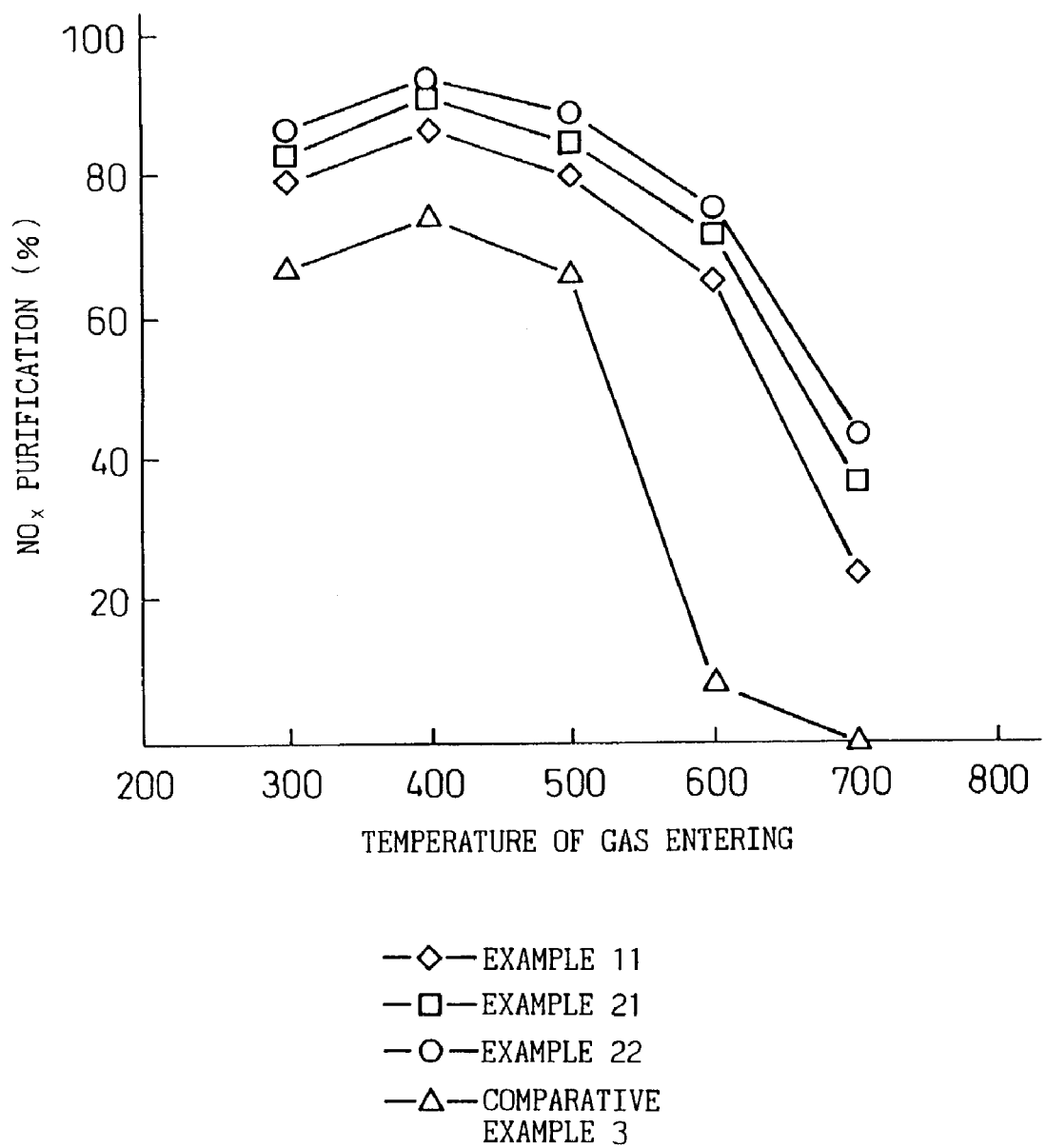
FIG. 7 is a graph comparing the $NO_x$ purification percentage of exhaust gas purifying catalysts.

The catalyst of Example 11 obtained by loading Cs, the catalyst of Example 21 obtained by loading Al and Cs, the catalyst of Example 22 obtained by further loading Pt, and the catalyst of Comparative Example 3 obtained by loading Cs on γ-alumina each was evaluated on the $NO_x$ purification percentage at 300° C., 400° C., 500° C., 600° C. and 700° C. under the conditions described above. FIG. 7 shows the results.

It is seen from the results shown in FIG. 7 that the catalyst of the present invention is enhanced in the $NO_x$ purifying capability even at temperatures lower than 500° C. and the $NO_x$ purifying capability is more enhanced by further loading Al.

(3) $NO_x$ Purification Percentage after Endurance Heat Treatment

The catalysts of Examples 11, 21 and 22 and Comparative Example 3 each was subjected to an endurance heat treatment of 850° C.×2 hours in a gas atmosphere having the following composition.

| Gas composition | 1,000 ppm of CO + 250 ppm of NO + 7.3% of $O_2$ + 6.7% of $CO_2$ + 5% of $H_2O$ (balance: $N_2$) |
|---|---|
| Gas space velocity: | 50,000 $h^{-1}$ |

Figure 8:
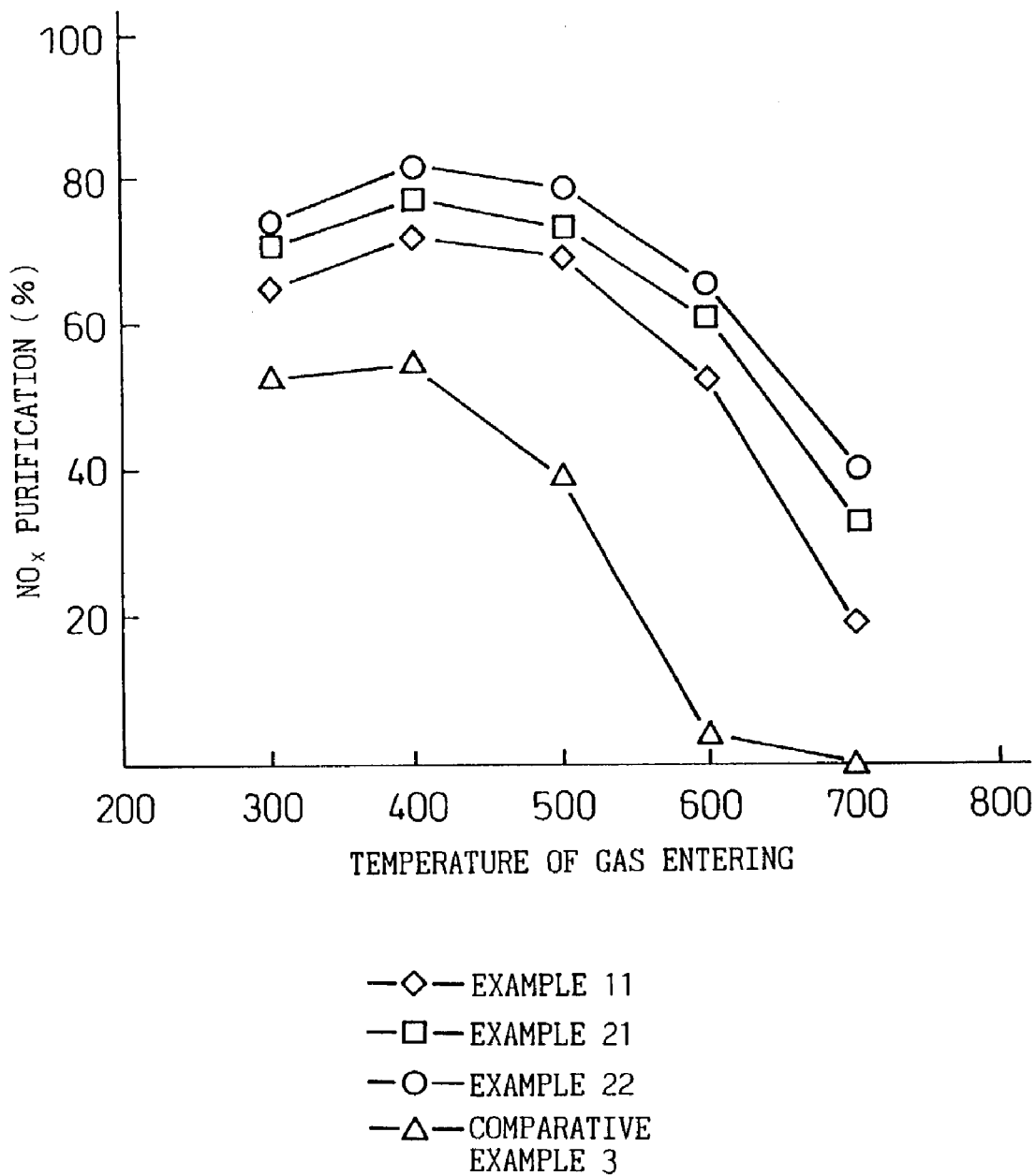
FIG. 8 is graph comparing the $NO_x$ purification percentage of exhaust gas purifying catalysts after an endurance heat treatment.

Subsequently, the $NO_x$ purifying capability at 300 to 700° C. was evaluated under the following conditions. FIG. 8 shows the results.

| Gas composition | 1,000 ppm of CO + 667 ppm of $C_3H_6$ + 250 ppm of NO + 7.3% of $O_2$ + 6.7% of $CO_2$ + 5% of $H_2O$ (balance: $N_2$) |
|---|---|
| Gas space velocity: | 50,000 $h^{-1}$ |

It is seen from the results shown in FIG. 8 that the exhaust gas purifying catalyst of the present invention maintains high $NO_x$ purifying capability even after the endurance heat treatment.

As verified above, the exhaust gas purifying catalyst of the present invention is excellent in the $NO_x$ purifying capability at high temperatures and also in the resistance against sulfur poisoning. This is considered to result because the alkali metal or alkaline earth metal necessary for producing a strong base site is present as ion and therefore, even if bonded to $SO_4^{2-}$, can be easily reduced.

INDUSTRIAL APPLICABILITY

As described in the foregoing pages, according to the present invention, an exhaust gas purifying catalyst exhibiting excellent $NO_x$ purifying capability under high exhaust gas temperature conditions, and also having high durability, can be provided.

The invention claimed is:

1. A $NO_x$ absorbent comprising a crystalline $ZrO_2$ composite oxide having supported thereon at least one element selected from the alkali metals and alkaline earth metals, the $ZrO_2$ composite oxide having the formula:

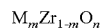

Wherein M is at least one element of a trivalent rare earth metal selected from Sc, Y, La, Nd, Pm, Sm, Eu, Gd, Dy, Ho, Er, Tm, Yb and Lu, and a divalent alkaline earth metal selected from Be, Mg, Ca, Sr, Ba and Ra; 0.01<m<0.5 and 1.5<n<2.0.

2. The $NO_x$ absorbent as claimed in claim 1, further comprises aluminum is supported on said $ZrO_2$ composite oxide.

3. An absorption reduction-type $NO_x$ purifying catalyst comprising the $NO_x$ absorbent as claimed in claim 2.

4. An absorption reduction-type $NO_x$ purifying catalyst comprising the $NO_x$ absorbent as claimed in claim 2 and a noble metal.

5. An absorption reduction-type $NO_x$ purifying catalyst comprising the $NO_x$ absorbent as claimed in claim 1 or claim 2.

6. An absorption reduction-type $NO_x$ purifying catalyst comprising the $NO_x$ absorbent as claimed in claim 1 or claim 2 and a noble metal.

* * * * *